Jan. 30, 1945.  F. V. DONALD  2,368,290
TRACTOR FOR GARDEN CULTIVATORS AND OTHER IMPLEMENTS
Filed Nov. 19, 1941  4 Sheets-Sheet 1

Inventor
Forrest V. Donald

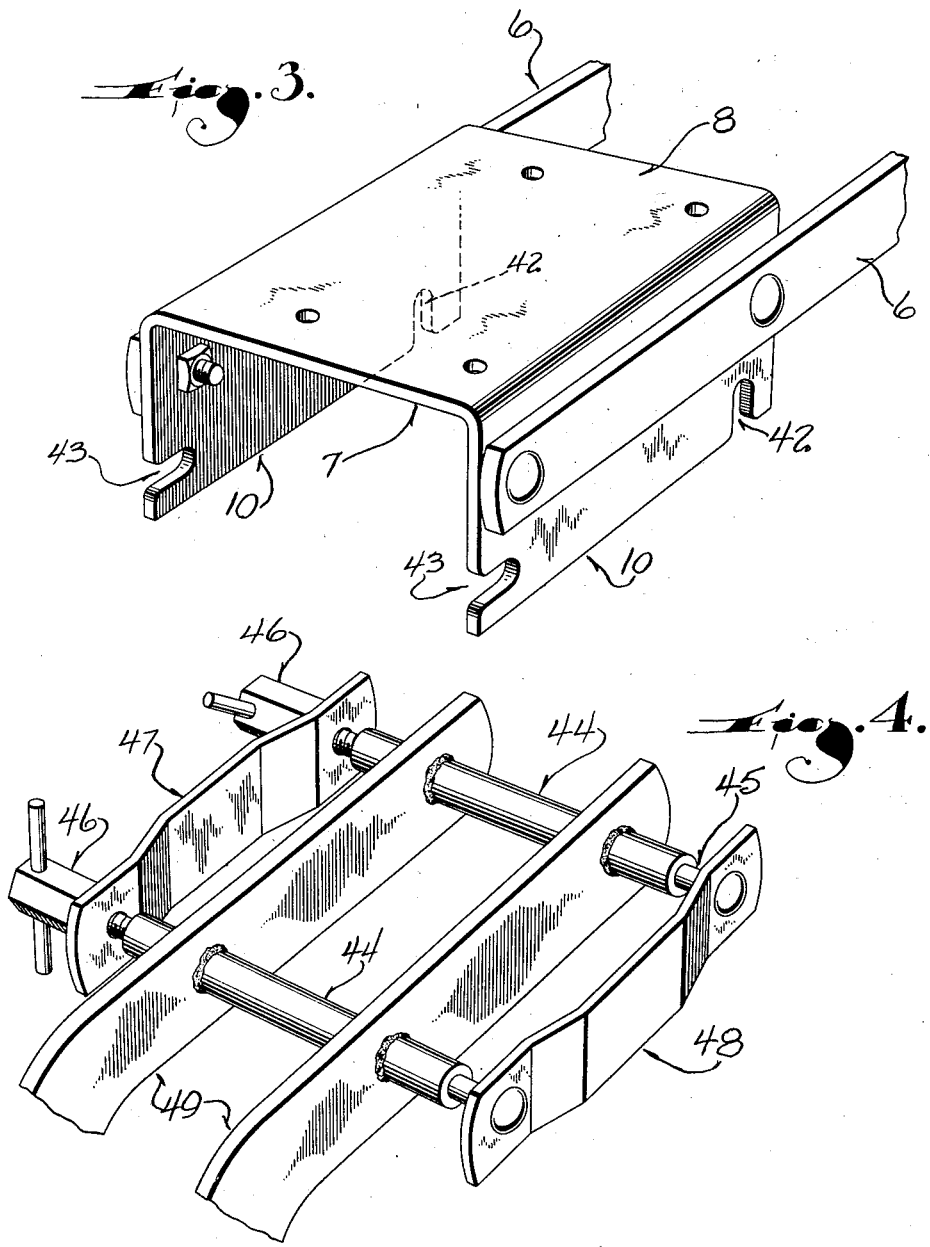

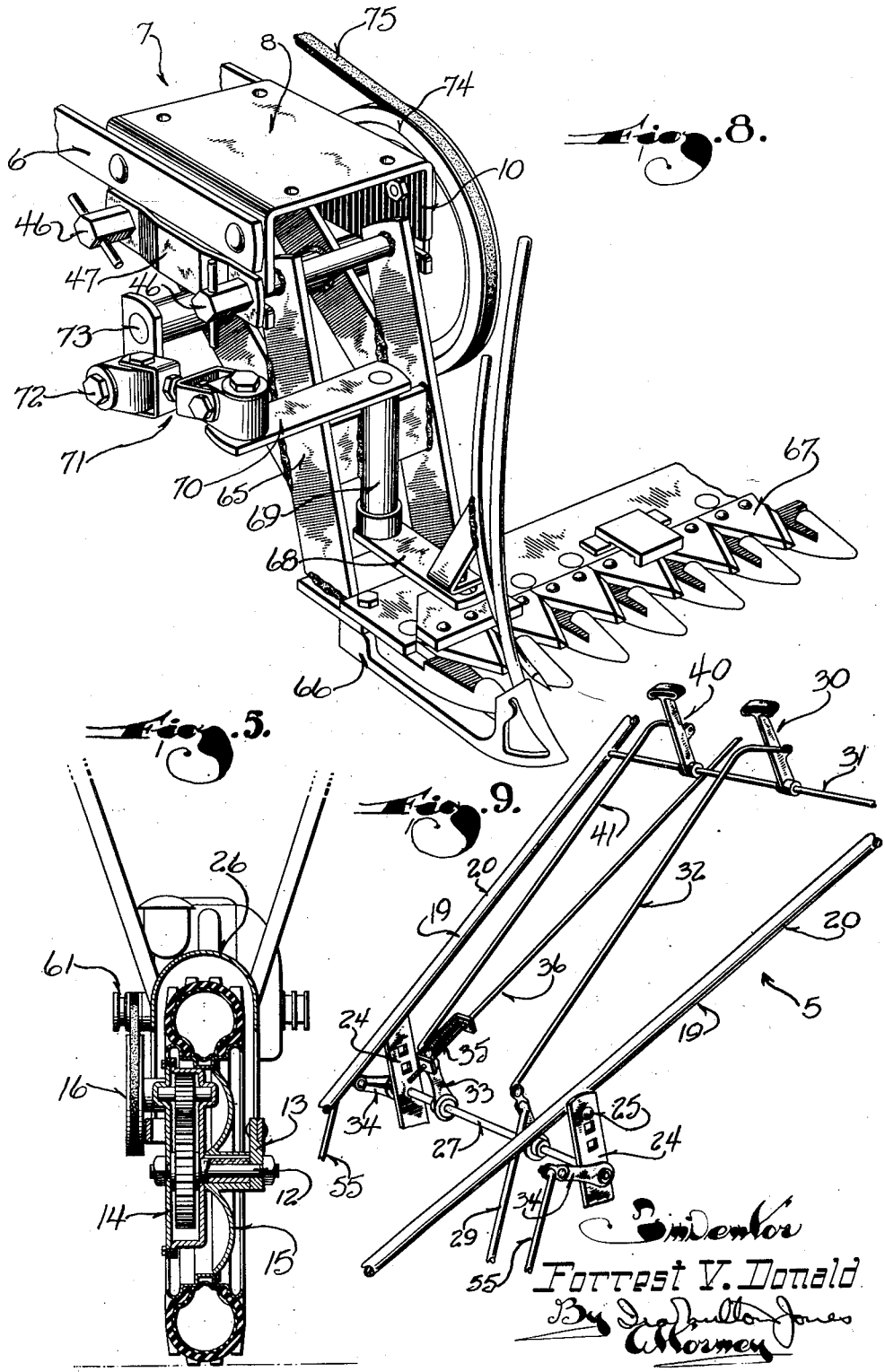

Jan. 30, 1945. F. V. DONALD 2,368,290
TRACTOR FOR GARDEN CULTIVATORS AND OTHER IMPLEMENTS
Filed Nov. 19, 1941 4 Sheets-Sheet 4
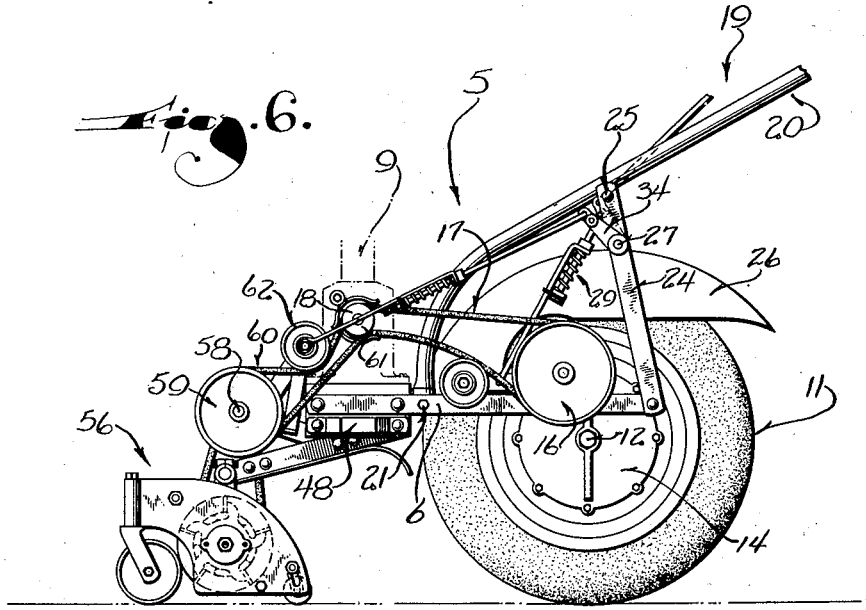
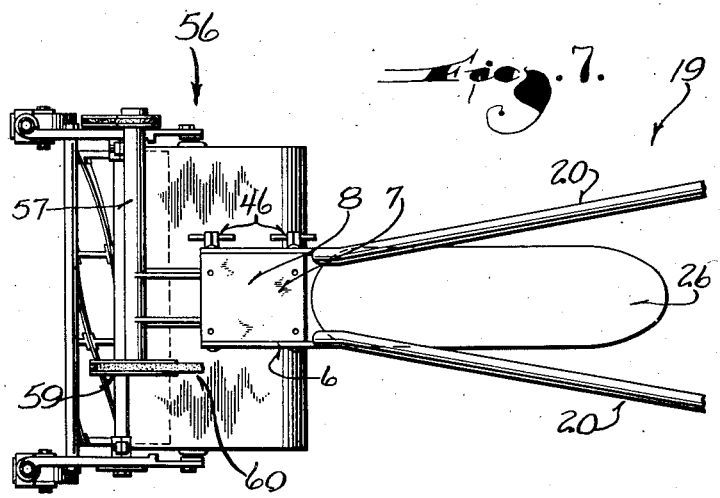
Inventor
Forrest V. Donald Patented Jan. 30, 1945

2,368,290

UNITED STATES PATENT OFFICE 2,368,290

TRACTOR FOR GARDEN CULTIVATORS AND OTHER IMPLEMENTS

Forrest V. Donald, Port Washington, Wis., assignor to Simplicity Manufacturing Company, Port Washington, Wis., a corporation of Wisconsin Application November 19, 1941, Serial No. 419,703

19 Claims. (Cl. 130—19)

This invention relates to power driven garden and farming implements and refers particularly to a tractor for garden cultivators and the like. It is an object of this invention to provide a light, economical garden tractor adapted to have different implements such as cultivators and lawn mowers attached thereto.

Another object of this invention is to provide a tractor of the character described which has but a single traction wheel so as to facilitate guiding the same in cramped quarters and small areas.

It is another object of this invention to provide a tractor having but a single traction wheel and which is so designed that the weight of the entire unit is substantially balanced on the median plane of the single wheel.

Another object of this invention is to provide an efficient and exceedingly simple manner of quickly detachably connecting a cultivator, mower, or other implement to the tractor. In this respect it is a further object of this invention to provide attaching means by which the implement is rigidly locked against up and down and back and forth motion with relation to the tractor.

Another object of this invention resides in the provision of simple means for raising and lowering the frame of a cultivator attached to the tractor and for adjusting its elevation with relation to the tractor.

Another object of this invention is to provide a power driven hand controlled cultivator wherein the track formed by the traction wheel is broken up.

Another object of this invention resides in the provision of novel means for transmitting a drive from the tractor engine to the reciprocal knife or cutter of a sickle bar attachment which is readily connectible to the tractor.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 3 is a detail perspective view showing that portion of the tractor frame which constitutes th tractor portion of the attachment hitch;

Figure 4 is a perspective view of that part of the attachment frame which is common to all attachments and which cooperates with the part shown in Figure 3 to complete the hitch;

Figure 5 is a cross sectional view through the traction wheel, said view being taken on the plane of the line 5—5 in Figure 1;

Figure 6 is a side view of the tractor illustrating its attachment to a lawn mower;

Figure 7 is a top plan view of the lawn mower-tractor combination shown in Figure 6;

Figure 8 is a perspective view illustrating part of the tractor and its attachment to a sickle bar; and Figure 9 is a perspective view of part of the tractor handle structure to illustrate particularly the means provided for lifting the cultivator and adjusting its depth.

Figure 1:
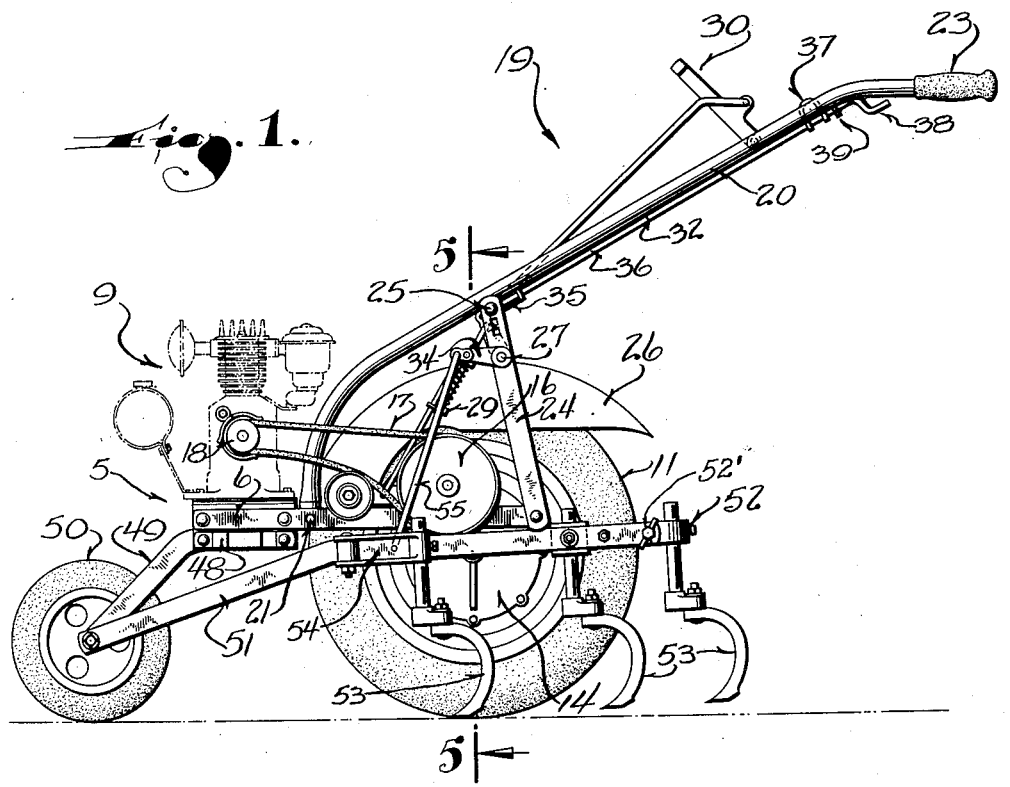
Figure 1 is a view in side elevation of a tractor constructed in accordance with this invention and illustrating a cultivator attached thereto.

Referring now particularly to the accompanying drawings, in which like numerals indicate like parts, the numeral 5 designates generally the frame of a tractor and which consists essentially of two side rails 6 rigidly connected at their forward ends by an inverted U-shaped stamping 7. The web 8 of this stamping is disposed horizontally and provides a platform for a gasoline engine 9 or other suitable power unit, and it is to be observed that the flanges 10 of the U-shaped stamping extend down beneath the side rails 6.

The side rails 6 embrace a single traction wheel 11, the axle 12 of which is connected with the side rails to support the frame. At one side a depending bearing bracket 13 provides the connection between the axle and the adjacent side rail. At the opposite side the axle is journalled in a gear case 14 which in turn is fixed to the adjacent side rail.

As will be clear from Figure 5, the web 15 of the traction wheel is dished and its hub is located at one side so as to accommodate the gear case and allow the weight of the unit to be more or less centered about the median plane of the wheel.

The gearing within the case 14 provides a drive transmission from a pulley 16 to the traction wheel. The pulley 16 is mounted on the projecting end of the shaft of one of the gears and has a belt 17 trained about it to transmit the drive from the engine pulley 18.

At a point directly rearwardly of the U-shaped stamping 7, the side rails 6 have a handle structure indicated generally by the numeral 19 attached thereto. The handle structure comprises two handle bars 20 having their lower forward ends pivotally connected as at 21 to the side rails and having their upper ends connected by a rigid crossbar 22 with their grip portions 23 at a convenient elevation which may be adjusted within limits.

The elevation of the handles is determined by links 24 which extend upwardly from the rear portions of the side rails and are bolted to the handle bars as at 25. A series of holes in the links in which the bolts 25 may be selectively engaged provides limited adjustment for the elevation of the handle grips.

For the sake of appearance, a fender 26 secured to the frame is arched over the tire of the traction wheel; and at a point directly above this fender the links 24 are connected by a cross shaft 27.

Loosely mounted on the cross shaft 27 is a lever 28 to which a belt tightener 29 is connected. Upon rocking the lever 28 upwardly about the shaft 27, the tightener draws the belt 17 taut and establishes a drive transmission from the engine to the pulley 16. Such upward rocking motion may be imparted to the lever 28 by means of a hand lever 30 journalled on a cross shaft 31 mounted on the handle bars directly forwardly of the cross member 22, the levers 28 and 30 being connected by a tie rod 32.

The cross shaft 27 has another lever 33 mounted thereon which, however, is pinned or otherwise secured thereto, and pinned or otherwise secured to the outer extremity of the cross shaft are levers 34.

These levers 34 may be rocked to raise and lower their extremities for a purpose to be hereinafter described by rocking the shaft 27 on its axis. Two separate means are provided for rocking the shaft. One of these means consists of a nut member 35 connected to the extremity of the lever 33 in which an adjusting screw 36 is threaded.

The adjusting screw is conveniently provided by an elongated rod having a thread cut on its lower end and having its upper end slidably supported in a bearing 37 secured to the crossbar 22. The outermost end of the rod is bent to provide a crank 38 to facilitate turning the same and outwardly of the bearing 37 the rod has a stop abutment 39 fixed thereon to support the rod and consequently the screw against downward motion.

Hence, by turning the screw farther in or withdrawing it from the nut member, it is possible to adjust the elevation of the extremities of the levers 34 fixed to the shaft 27.

The shaft 27 may also be abruptly rocked to lift the levers 34 or allow them to descend, by means of a hand lever 40 similar to the lever 30 and likewise journalled on the cross shaft 31. This hand lever 40 is connected to the lever 33 by a tie rod 41.

As noted hereinbefore, the side flanges 10 of the U-shaped stamping 7 extend down beneath the side rails 6. These depending portions of the side flanges constitute the tractor carried part of a hitch by which any implement or attachment may be quickly connected to the tractor.

Figure 2:
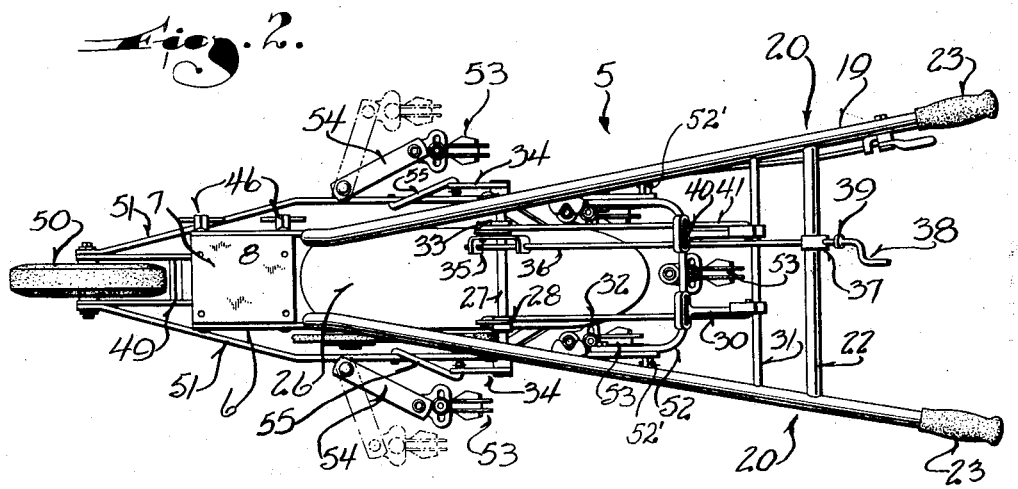
Figure 2 is a top plan view thereof.

In the embodiment of the invention illustrated, three different attachments or implements are illustrated, one a cultivator shown in Figures 1 and 2, another a lawn mower shown in Figures 6 and 7, and the third illustrated in Figure 8 being a sickle bar. All of these attachments use the same construction in their hitch forming portions.

The two complementary parts of the hitch are illustrated in detail in Figures 3 and 4. As here shown the tractor part of the hitch consists of two sets of notches 42 and 43 in the side flanges of the U-shaped stamping. The first of these two sets of notches opens to the lower horizontal edge of the side flanges and the latter set of notches opens to the front vertical edge of the side flanges.

The attachment carried part of the hitch comprises two tubes 44 each containing a clamping screw. The tubes are welded or otherwise secured to the frame of the attachment and are of length to fit snugly between the side flanges 10.

The spacing of the tubes 44 is such that their axes will align with the inner ends or bottoms of the notches 42 and 43 so that the ends of the clamping screws which project from the tubes engage in the notches. When such engagement is effected the attachment is secured against horizontal or vertical motion with respect to the tractor.

Engagement of the clamping screws in the notches is readily releasably maintained by clamping nuts 46 threaded on the ends of the screws and clamping plates 47 and 48, the former being engaged by the nuts and the latter by the heads of the screws. Obviously, when the hitch is established, these clamping plates press against the outer sides of the flanges 10 to clamp the flanges between the plates and the ends of the tubes 44 which, of course, are larger in diameter than the width of the notches.

The clamping plates and the ends of the tubes thus constitute spaced abutments or in effect, the jaws of a clamp.

With this arrangement, as will be readily apparent, the tractor can be practically rolled into the attachment and by properly elevating the handles the horizontal notches 43 opening to the front ends of the side flanges 10 can be caused to embrace the screw in the forward tube 44, and thereafter by merely pressing down on the handles to elevate the forward end of the tractor, the complementary parts of the hitch, that is, the flanges 10 with their notches and the tubes 44 with their clamping screws will pivot relative to each other about the axis of the front clamping screw until the screw 45 in the rear tube 44 engages in the notches 42.

As stated, all of the attachments have the tubes 44 and the clamping screws carried thereby. The specific way in which the tubes are mounted or connected to the attachment may, however, vary.

In the case of the cultivator, the tubes 44 are welded to the arms 49 of a fork which embraces a pilot wheel 50 and is connected to its axle. The rest of the cultivator consists of two drawbars 51 hinged to the axle of the pilot wheel and extending rearwardly alongside the traction wheel to have their rear ends connected by a yoke 52 readily detachably connected, as at 52', to the ends of the drawbars.

Along the length of these drawbars, cultivator plows 53 or other ground working tools are secured. The forward plows may be mounted on outriggers 54 hinged to the drawbars to allow the same to be set at different distances out from the axis of the unit, and the yoke 52 preferably carries a plow at its medial portion so as to dig up the track formed by the traction wheel.

The frame of the cultivator consisting of these drawbars is supported from the extremities of the levers 34 by links 55 the upper ends of which are readily detachably securable to the levers 34. Hence, the elevation of the cultivator frame may be finely adjusted by means of the crank 38 or abruptly raised and lowered by means of the hand lever 40, both of which rock the shaft 27 to raise and lower the extremities of the levers 34 as hereinbefore described.

In the lawn mower attachment the tubes 44 are carried by a frame structure indicated generally by the numeral 56, which includes a bearing 57 for a jack shaft 58, one end of which has a pulley 59 fixed thereto. This pulley is adapted to have a belt 60 trained thereover which also passes over a second pulley 61 on the engine shaft to carry a drive to the rotating knives of the mower. The transmission of power to the knives is controlled by a belt tightener 62 actuated from one of the levers 34 on the cross shaft 27. As clearly shown in Figure 6, rocking of the shaft 27 to raise or lower the lever 34 causes the belt tightener to increase or decrease the tension on the belt 60.

If the attachment is in the form of a sickle bar as shown in Figure 8, the tubes 44 are welded to the upper end of a frame structure 65, the lower extremity of which carries the stationary bar 66 of the cutter unit.

The movable cutter bar 67 which reciprocates in suitable guides to have its knives cross the teeth of the stationary bar, is adapted to be driven by means of a lever 68 fixed to the lower end of a shaft journalled in a vertical bearing 69, the upper end of which has a lever 70 fixed thereto. The connected levers 68 and 70 are disposed at an angle to each other and in effect constitute a bell crank lever.

The extremity of the lever 70 is connected by a link 71 to the pin 72 of a crank. The arm of the crank is fixed to a shaft 73 journalled in a bearing carried by the frame 65. The opposite end of the shaft 73 has a pulley 74 fixed thereto over which a belt 75 is trained to transmit the drive from the engine to the crank, the belt 75 being trained over the second pulley 61 on the engine shaft.

From the foregoing description, taken in connection with the accompanying drawings, it will be readily apparent to those skilled in the art that this invention provides a highly practical tractor unit for small garden implements and that the ease with which different attachments may be connected thereto makes its use with a wide variety of attachments a practical and feasible possibility.

What I claim as my invention is:

1. A tractor for garden cultivators and the like comprising: a single traction wheel; a frame including spaced side rails embracing the wheel; a handle structure connected with the frame and extending upwardly and rearwardly of the wheel; a cross shaft supported on the handle structure above the wheel; a lever fixed to the cross shaft; a link depending from the free end of said lever to adjustably support a cultivator or other ground working implement; a second lever fixed to the cross shaft; a nut connected to said second lever; a supporting rod screwed into the nut and extending upwardly toward the grips of the handle structure; a bearing for the upper end of said supporting rod carried by the handle structure; a stop abutment on the supporting rod engageable with the bearing to limit forward downward motion of said rod to thereby support the cross shaft against rotation by weight suspended from said link whereby the elevation of an implement supported by the link is readily adjusted by screwing said supporting rod into or out of the nut; means for readily rotating said rod to effect such adjustment; and means for rocking the cross shaft to lift any implement supported from the link out of ground engagement.

2. A power driven garden cultivator of the character described comprising: a single traction wheel; a main frame including spaced side rails embracing the wheel; an axle for the wheel connected to the side rails; a power unit on the main frame drivingly connected with the traction wheel; a handle structure extending upwardly and rearwardly of said frame and having handle grips at the upper rear portion thereof; a detachable cultivator including a pilot wheel; a fork extending upwardly and rearwardly from the axle of the pilot wheel; a readily detachable connection between the fork and the main frame; a drawbar extending rearwardly of the pilot wheel alongside the traction wheel; ground engaging devices attached to said drawbar; means for adjustably and readily detachably supporting said drawbar from the handle structure; and means actuatable from a point adjacent to the handle grips for adjusting the elevation of said drawbar.

3. In a garden cultivator of the character described: a single traction wheel; a main frame supported on the traction wheel; a power unit mounted on said frame and drivingly connected with the traction wheel; a handle structure connected with the main frame and extending upwardly and rearwardly of the wheel; a pilot wheel; means detachably connecting the pilot wheel with the main frame; an implement carrying frame connected with the pilot wheel and embracing the traction wheel; ground working tools fixed to said implement carrying frame; and means for adjustably and readily detachably supporting the implement carrying frame from the main frame.

4. In a tractor for garden cultivators and the like: a traction wheel; a main frame supported by the traction wheel, said main frame including spaced parallel downwardly directed flanges having one set of opposed notches opening to their lower edges and another set opening to one end; an implement to be driven by the tractor; and means for readily detachably connecting the implement thereto including a frame structure at all times carried by the implement engageable between said spaced flanges, and pin members on said frame structure engageable in said notches.

5. In a device consisting of a tractor and an implement to be driven thereby; means for readily detachably connecting the implement with the tractor comprising: spaced walls on the tractor; a frame structure fixed with relation to the implement; spaced transverse tubes carried by said frame structure; notches in the spaced walls positioned to align with the ends of said tubes; clamping screws in said tubes engageable in the notches; and means for drawing the clamping screws tight to clamp the sides of said spaced walls to the ends of the tubes.

6. In combination with a tractor and an implement to be driven thereby, a readily separable connection between the tractor and implement comprising: interengaging frame parts at all times carried by the tractor and implement respectively, one of said parts having spaced vertical flanges provided with notches in their edges, the other of said frame parts having projections engaging in said notches to locate the implement with relation to the tractor; and means for clamping said parts together.

7. In combination with a tractor and an implement to be driven thereby, a readily separable connection between the tractor and implement comprising: interengaging frame parts at all times carried by the tractor and implement respectively, one of said frame parts having vertical flanges, said flanges having two sets of notches in their edges, one set of notches opening to substantially vertical edges of the flanges and the other set of notches opening to substantially horizontal edges of the flanges; projections on the other frame part engageable in said notches, the engagement of the projections in one set of notches restraining the frame parts against relative up and down motion and the engagement of the projections in the other set of notches restraining the frame parts against relative forward and backward movement; and means for clamping said frame parts together.

8. In combination with a tractor and an implement to be driven thereby, a readily separable connection between the tractor and implement comprising: interengaging frame parts on the tractor and the implement; one of said frame parts comprising a substantially U-shaped stamping the flanges of which have sets of opposed notches, one set of notches opening to the longitudinal edges of the flanges and another set opening to one end of the flanges, the frame part of the implement having transverse tubular members of a length to fit between the flanges; a clamping screw in each of said transverse tubular members projecting from the ends thereof to be engageable in said notches, the engagement of one clamping screw in its notches restraining the frame parts against relative up and down motion, and the engagement of the other clamping screw in its notches restraining the frame parts against relative forward and backward movement; and means for drawing the clamping screws tight with the heads thereof bearing against one flange and the nuts thereof bearing against the opposite flange.

9. A hitch for connecting an attachment to a tractor comprising: cooperating parts at all times carried by the tractor and the attachment respectively, one of said parts having a substantially vertical wall provided with two notches; the other of said parts having spaced pin members engageable in said notches, the openings of said notches being substantially at right angles to each other so that the engagement of one of the pin members in its notch secures the parts against relative vertical motion and the engagement of the other pin member in its notch secures the parts against relative horizontal motion; and clamping means for readily releasably securing the pin members in the notches.

10. A hitch for connecting an attachment to a tractor comprising: cooperating parts at all times carried by the tractor and the attachment respectively, one of said parts having a substantially vertical wall provided with two notches; one of which is substantially horizontal and the other substantially vertical; cooperating abutments on the other of said parts providing the jaws of a clamp adapted to receive said vertical wall therebetween; pin members extending across the space between said cooperating abutments and positioned to engage in said notches; and means for drawing the jaws together to clamp said wall therebetween and to hold the pin members in their respective notches.

11. A hitch for quickly detachably connecting an implement to a tractor comprising: a tractor carried part having a notch disposed substantially horizontally and opening to one end of said part, and another notch disposed substantially vertically and opening to the bottom of said part; an implement carried part having spaced abutments engageable with the opposite sides of said tractor carried part; pin members extending across the space between said abutments and engageable in said notches, engagement of the pin members in said notches necessitating relative horizontal motion between said parts to engage the substantially horizontal notch with its pin member and subsequent pivotal motion of said parts with respect to each other about the axis of said engaged pin member to engage the other pin member in its notch; and means for drawing said abutments together to clamp the tractor carried part therebetween and hold the pin members against displacement from their respective notches.

12. A hitch for quickly detachably connecting an implement to a tractor comprising: a tractor carried part having a notch disposed substantially horizontally and opening to one end of said part, and another notch disposed substantially vertically and opening to the bottom of said part; an implement carried part having spaced abutments engageable with the opposite sides of said tractor carried part; and clamping screws extending across the space between said abutments for drawing said abutments together, said clamping screws being spaced to correspond with the spacing of the inner ends of said notches and being engageable in the notches, whereby upon engagement of the clamping screws in the notches and tightening of the clamping screws, said parts are quickly detachably connected in a manner rigidly securing them against relative horizontal or vertical motion.

13. A hitch construction for quickly detachably connecting an implement to a tractor of the garden type having a traction wheel about the axle of which the tractor may be rocked to raise and lower its front end, said hitch comprising: a tractor carried part located at the front end of the tractor so as to be readily raised and lowered by rocking of the tractor about the axle of its traction wheel; an implement carried part; front and rear detachable connections between said parts, the front connection comprising a substantially horizontal notch and a pin member engageable therein upon relative horizontal motion of said parts and the rear connection comprising a substantially vertical notch and a pin member positioned to engage therein upon relative pivotal motion of said parts about the axis of the first mentioned pin member when engaged in its substantially horizontal notch which relative pivotal motion may be produced by rocking the tractor about the axle of its traction wheel to lift the forward end of the tractor; and clamping means for clamping said parts together after engagement of said pin members in their respective notches.

14. A hitch construction for quickly detachably connecting an implement to a tractor of the garden type having a traction wheel about the axle of which the tractor may be rocked to raise and lower its front end, said hitch comprising: a tractor carried part located at the front end of the tractor so as to be readily raised and lowered, and an implement carried part, said tractor carried part having a substantially horizontal notch opening to its front end and a substantially vertical notch opening to its bottom rearwardly of said horizontal notch, the implement carried part having spaced horizontal front and back pin members the spacing of which corresponds to the spacing between the inner closed ends of the notches so that said pin members may be engaged in said notches by moving the tractor forwardly with relation to the implement to first engage said substantially horizontal notch with the front pin member of the implement, and then by rocking the tractor to lift the front end of the tractor causing said parts to move with a pivotal action relative to each other about the axis of the engaged pin member to effect engagement of the rear pin member in the substantially vertical notch; and clamping means for clamping said parts together with the pin members engaged in their respective notches.

15. A hitch construction for quickly detachably connecting an implement to a tractor of the garden type having a traction wheel about the axle of which the tractor may be rocked to raise and lower its front end, said hitch comprising: a tractor carried part located at the front end of the tractor so as to be readily raised and lowered, and an implement carried part, said tractor carried part having a substantially horizontal notch opening to its front end and a substantially vertical notch opening to its bottom rearwardly of said horizontal notch, the implement carried part having spaced horizontal front and back pin members the spacing of which corresponds to the spacing between the inner closed ends of the notches so that said pin members may be engaged in said notches by moving the tractor forwardly with relation to the implement to first engage said substantially horizontal notch with the front pin member of the implement, and then by rocking the tractor to lift the front end of the tractor causing said parts to move with a pivotal action relative to each other about the axis of the engaged pin member to effect engagement of the rear pin member in the substantially vertical notch; clamping jaws connected with said pin members to engage opposite sides of the tractor carried part; and means for placing the pin members in tension to draw said clamping jaws together and grip the tractor carried part therebetween.

16. In a garden tractor of the character described: a main frame including a substantially inverted U-shaped stamping, the web of which provides a substantially horizontally engine platform and the side flanges of which have sets of substantially horizontal and substantially vertical notches opening respectively to the front ends of the flanges and to the bottom edges of the flanges to provide for the attachment of an implement to the tractor; the substantially vertical notches which open to the bottom edges of the flanges being disposed rearwardly of the other notches so that all of said notches may be readily engaged with pin members on an implement by hooking the front notches on one pin member and thereafter bringing the rear notches and their respective pin member toward and into interengagement with each other by relative pivotal motion between said flanges and the implement.

17. A device of the character described comprising: a single power driven traction wheel; a main frame including spaced side rails embracing the traction wheel; an axle for the wheel connected to the side rails; a handle structure connected to the main frame adjacent to the traction wheel and extending upwardly above and rearwardly of said wheel and having handle grips at the upper rear portion thereof; a ground working implement having a frame attached to the main frame of the device; a pilot wheel carried by said frame a relatively short distance forwardly of the traction wheel; drawbars connected with the axle of the pilot wheel and extending rearwardly thereof alongside the traction wheel; and ground working tools fixed to the draw bars alongside the traction wheel.

18. A device of the character described comprising: a single power driven traction wheel; a main frame including spaced side rails embracing the traction wheel; an axle for the wheel connected to the side rails; a handle structure connected with the main frame adjacent to the traction wheel and extending upwardly above and rearwardly of said wheel and having handle grips at the upper rear portion thereof; a ground working implement having a frame attached to the main frame of the device; a pilot wheel carried by said frame a relatively short distance forwardly of the traction wheel; drawbars connected with the axle of the pilot wheel and extending rearwardly thereof alongside the traction wheel; a yoke extending around the rear of the traction wheel and connecting the rear ends of said drawbars; and ground working tools, one of which is carried by said yoke substantially on the median plane of the traction wheel and the others of which are carried by the drawbars so as to be located alongside the traction wheel.

19. A device of the character described comprising: a single power driven traction wheel; a main frame including spaced side rails embracing the traction wheel; an axle for the wheel connected to the side rails; a handle structure connected to the main frame adjacent to the traction wheel and extending upwardly above and rearwardly of said wheel and having handle grips at the upper rear portion thereof; a ground implement having a frame; a pilot wheel carried by said frame; a readily detachable connection between said frames by which the implement is held assembled with the device with its pilot wheel located a short distance forwardly of the traction wheel, detachment of the main frame from the implement frame entailing rearward motion of the main frame relative to the implement frame; drawbars connected with the axle of the pilot wheel and extending rearwardly therefrom to embrace the traction wheel; a yoke extending around the rear of the traction wheel and connecting the rear ends of said drawbars; ground working tools, one of which is carried by the yoke substantially on the median plane of the traction wheel and the others of which are carried by the drawbars so as to be located alongside the traction wheel; and a readily detachable connection between the yoke and said drawbars permitting the yoke to be removed out of the path of the traction wheel during detachment of the implement from the device.

FORREST V. DONALD.